(12) United States Patent
Dave et al.

(10) Patent No.: US 9,287,979 B2
(45) Date of Patent: *Mar. 15, 2016

(54) DAC-BASED OPTICAL MODULATOR AND DEMODULATOR

(71) Applicant: ViaSat, Inc., Carlsbad, CA (US)

(72) Inventors: Sameep Dave, Hinckley, OH (US); Matthew Nimon, Hinckley, OH (US); Fan Mo, Hinckley, OH (US); William Thesling, Hudson, OH (US)

(73) Assignee: ViSat, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,720

(22) Filed: Apr. 2, 2014

(65) Prior Publication Data

US 2014/0363173 A1 Dec. 11, 2014

Related U.S. Application Data

(63) Continuation of application No. 13/356,167, filed on Jan. 23, 2012, now Pat. No. 8,731,413.

(51) Int. Cl.
| | |
|---|---|
| *H04B 10/00* | (2013.01) |
| *H04B 10/2513* | (2013.01) |
| *H04B 10/516* | (2013.01) |
| *H04B 10/69* | (2013.01) |
| *H04B 10/2507* | (2013.01) |
| *H04B 10/60* | (2013.01) |
| *H04L 7/00* | (2006.01) |
| *H04L 25/03* | (2006.01) |

(52) U.S. Cl.
CPC ...... *H04B 10/25137* (2013.01); *H04B 10/2507* (2013.01); *H04B 10/516* (2013.01); *H04B 10/60* (2013.01); *H04B 10/6971* (2013.01); *H04L 7/0075* (2013.01); *H04L 25/03834* (2013.01)

(58) Field of Classification Search
USPC .................................................. 398/202–214
See application file for complete search history.

(56) References Cited

U.S. PATENT DOCUMENTS

| | | | | |
|---|---|---|---|---|
| 6,275,523 | B1 * | 8/2001 | Chen et al. | 375/226 |
| 6,671,334 | B1 * | 12/2003 | Kuntz et al. | 375/340 |
| 7,352,824 | B2 * | 4/2008 | Vrazel et al. | 375/295 |
| 7,382,984 | B2 * | 6/2008 | McNicol et al. | 398/147 |
| 7,558,479 | B1 * | 7/2009 | Robinson | 398/28 |
| 7,701,842 | B2 * | 4/2010 | Roberts et al. | 370/210 |
| 7,991,300 | B2 * | 8/2011 | Heffner et al. | 398/202 |
| 8,023,402 | B2 * | 9/2011 | Roberts et al. | 370/210 |
| 8,145,066 | B2 * | 3/2012 | Painchaud et al. | 398/193 |
| 8,170,494 | B2 * | 5/2012 | Husted et al. | 455/73 |
| 8,229,303 | B1 * | 7/2012 | Lindsay | 398/193 |

(Continued)

*Primary Examiner* — Agustin Bello
(74) *Attorney, Agent, or Firm* — Holland & Hart LLP

(57) ABSTRACT

Methods, systems, and devices are described for modulating and demodulating data on optical signals. During modulation, at least one stream of symbol mapped bits is filtered with at least one pulse shaping filter to reduce a bandwidth of the stream of bits and to pre-compensate for at least one identified non-ideal transmission condition. The filtered bits are modulated onto a waveform in the digital domain, and the modulated filtered bits are transmitted to digital-to-analog converter. The output of the digital-to-analog converter is converted to an optical signal. During demodulation, a received optical signal is sampled at a first sampling rate at an ADC, downsampled to a lower sampling rate for filtering, filtered with at least one discrete pulse-shaping filter, upsampled for equalization and demodulation, and then equalized and demodulated.

32 Claims, 13 Drawing Sheets

(56) References Cited

U.S. PATENT DOCUMENTS

| | | | |
|---|---|---|---|
| 8,244,141 B2* | 8/2012 | Fu et al. | 398/193 |
| 8,401,108 B1* | 3/2013 | Haddadin et al. | 375/295 |
| 8,406,323 B2* | 3/2013 | Huang et al. | 375/260 |
| 8,693,890 B2* | 4/2014 | Qian et al. | 398/188 |
| 8,731,413 B1* | 5/2014 | Dave et al. | 398/208 |
| 8,768,177 B2* | 7/2014 | Wu et al. | 398/194 |
| 8,831,439 B2* | 9/2014 | Wu et al. | 398/183 |
| 9,025,651 B1* | 5/2015 | Dave et al. | 375/229 |
| 9,036,751 B1* | 5/2015 | Wang et al. | 375/350 |
| 2002/0024694 A1* | 2/2002 | Newell et al. | 359/124 |
| 2002/0167703 A1* | 11/2002 | Merritt | 359/173 |
| 2004/0067064 A1* | 4/2004 | McNicol et al. | 398/158 |
| 2005/0286619 A1* | 12/2005 | Haddadin et al. | 375/222 |
| 2006/0024062 A1* | 2/2006 | Jakober et al. | 398/141 |
| 2006/0031274 A1* | 2/2006 | Haddadin et al. | 708/300 |
| 2006/0078336 A1* | 4/2006 | McNicol et al. | 398/147 |
| 2008/0019703 A1* | 1/2008 | Burchfiel | 398/183 |
| 2009/0136238 A1* | 5/2009 | Gill et al. | 398/141 |
| 2009/0201796 A1* | 8/2009 | Roberts et al. | 370/210 |
| 2009/0207926 A1* | 8/2009 | Huang et al. | 375/260 |
| 2010/0178057 A1* | 7/2010 | Shieh | 398/79 |
| 2012/0082459 A1* | 4/2012 | Wu et al. | 398/79 |
| 2012/0082460 A1* | 4/2012 | Wu et al. | 398/79 |
| 2012/0082466 A1* | 4/2012 | Wu et al. | 398/183 |
| 2012/0134665 A1* | 5/2012 | Lindsay | 398/16 |
| 2012/0189319 A1* | 7/2012 | Mo et al. | 398/152 |
| 2012/0251119 A1* | 10/2012 | McNicol et al. | 398/91 |
| 2013/0089326 A1* | 4/2013 | Djordjevic et al. | 398/44 |
| 2014/0105325 A1* | 4/2014 | Huang et al. | 375/296 |
| 2014/0169501 A1* | 6/2014 | Nazarathy et al. | 375/316 |
| 2014/0363173 A1* | 12/2014 | Dave et al. | 398/149 |
| 2014/0369698 A1* | 12/2014 | Wu et al. | 398/183 |

* cited by examiner

DAC-BASED OPTICAL MODULATOR AND DEMODULATOR

CROSS REFERENCES

The present application for patent is a continuation of U.S. patent application Ser. No. 13/356,167 by Dave et al., entitled "DAC-based Optical Modulator and Demodulator," filed Jan. 23, 2012, and is expressly incorporated by reference herein.

BACKGROUND

The present disclosure relates to systems and methods digital modulation and demodulation of data in a fiber optic communications system.

Fiber optic channels in network communications systems are well known and are considered effective for data transmission, allowing relatively high bandwidth data communication. Optical fiber used in such channels is flexible and can be bundled as cables, and is generally considered to be appropriate for long-distance communications because light propagates through the fiber with little attenuation compared to electrical cables. Typical present day commercial optical fiber systems transmit data at 10 or 40 Gbit per second. Each fiber can carry multiple independent channels, each using a different wavelength of light in a technique known as wavelength-division multiplexing (WDM), thereby enhancing the net data rate of an optical fiber.

As more capacity is continually desired for networks, a demand for increased data transmission rates exists. However, in fiber optic systems, as data rates increase various optical phenomena begin to manifest and act to limit data transmission rates. For example, chromatic dispersion of a transmitted optical signal may occur between a transmitter and a receiver, and detrimentally affect the ability of the receiver to demodulate and decode the transmitted optical signal.

SUMMARY

Methods, systems, and devices are described for modulating and demodulating data on optical signals.

In a first set of embodiments, a method of modulating data onto an optical signal includes filtering at least one stream of symbol mapped bits with at least one discrete pulse shaping filter to reduce a bandwidth of the stream of bits and to precompensate for at least one identified non-ideal transmission condition. The filtered bits are modulated onto a frequency waveform in the digital domain, and the modulated filtered bits are transmitted to a digital-to-analog converter. An output of the digital-to-analog converter is then converted to an optical signal.

In a second set of embodiments, a transmitter device includes a pulse shaping filtering module, a modulation module, a digital-to-analog converter, and an electrical-to-optical module. The pulse shaping filtering module is configured to filter at least one stream of symbol-mapped bits with at least one discrete pulse shaping filter to reduce a bandwidth of the stream of bits and to pre-compensate for at least one identified non-ideal transmission condition. The modulation module is configured to modulate the filtered bits onto a waveform in the digital domain. The digital-to-analog converter is configured to generate an analog version of the modulated filtered bits. The electrical-to-optical module is configured to convert the analog version of the modulate filtered bits into an optical signal.

In a third set of embodiments, a method of demodulating an optical signal includes sampling a received optical signal having pulse shaped data modulated onto a waveform at a first sampling rate to generate a first digital version of the optical signal. The first digital version of the optical signal is downsampled to generate a second digital version of the optical signal. The second digital version of the optical signal is filtered with at least one discrete pulse shaping filter. The filtered second digital version of the optical signal is then upsampled to generate a third digital version of the optical signal. An equalization function is performed on the third digital version of the optical signal, and a stream of data is demodulated from the third digital version of the optical signal.

In a fourth set of embodiments, an optical modem apparatus includes an optical transmitter and an optical receiver. The optical transmitter is configured to filter at least one stream of symbol mapped bits with at least a first discrete pulse shaping filter to precompensate for at least one identified non-ideal transmission condition and modulate the filtered symbol mapped bits to a first analog optical signal. The optical receiver is configured to sample a second optical signal at a first sampling rate with an analog-to-digital converter to generate a first digital version of the second optical signal. The optical receiver downsamples the first digital version of the second optical signal to generate a second digital version of the second optical signal, and filters the second digital version of the second optical signal with at least a second pulse shaping filter to compensate for the at least one identified non-ideal transmission conditions. The optical receiver upsamples the filtered second digital version of the second optical signal to generate a third digital version of the second optical signal, and an equalization function is performed on the third digital version of the second optical signal. The optical receiver demodulates a stream of data from the equalized third digital version of the second optical signal.

BRIEF DESCRIPTION OF THE DRAWINGS

A further understanding of the nature and advantages of embodiments of the present disclosure may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Methods, systems, and devices are described for modulating data onto optical signals and demodulating data from optical signals. Through the use of high-speed digital-to-analog converters (DACs) and analog-to-digital converters (ADCs), data can be modulated onto carrier signals within the optical spectrum in the digital domain. In this way, pulse shaping filtering may be applied to the data during modulation and demodulation to reduce the bandwidth of the optical signals and precompensate for non-ideal conditions occurring during the modulation, transmission, and demodulation of the data. For example, a pulse-shaping filter may be tuned to precompensate for predicted optical non-idealities, such as chromatic dispersion, that may occur in an optical fiber at a modulator.

Through the use of pulse-shaping filters at the modulator and demodulator, digital representations of the sampled optical signal may be downsampled to a sampling rate just higher than the symbol rate at a demodulator for filtering and other processing without causing inter-symbol interference or data loss. For example, an optical signal may be sampled at twice the symbol rate at a high-speed ADC, downsampled to 1.2 or 1.3 times the symbol rate for filtering and other processing in the digital domain, upsampled to twice the symbol rate for equalization, and demodulated after equalization. The reduction of the sampling rate for at least a portion of the demodulation process may reduce the complexity, size, cost, and power consumption of demodulation circuitry.

This description provides examples, and is not intended to limit the scope, applicability or configuration of embodiments of the principles described herein. Rather, the ensuing description will provide those skilled in the art with an enabling description for implementing embodiments of the principles described herein. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

Figure 1:
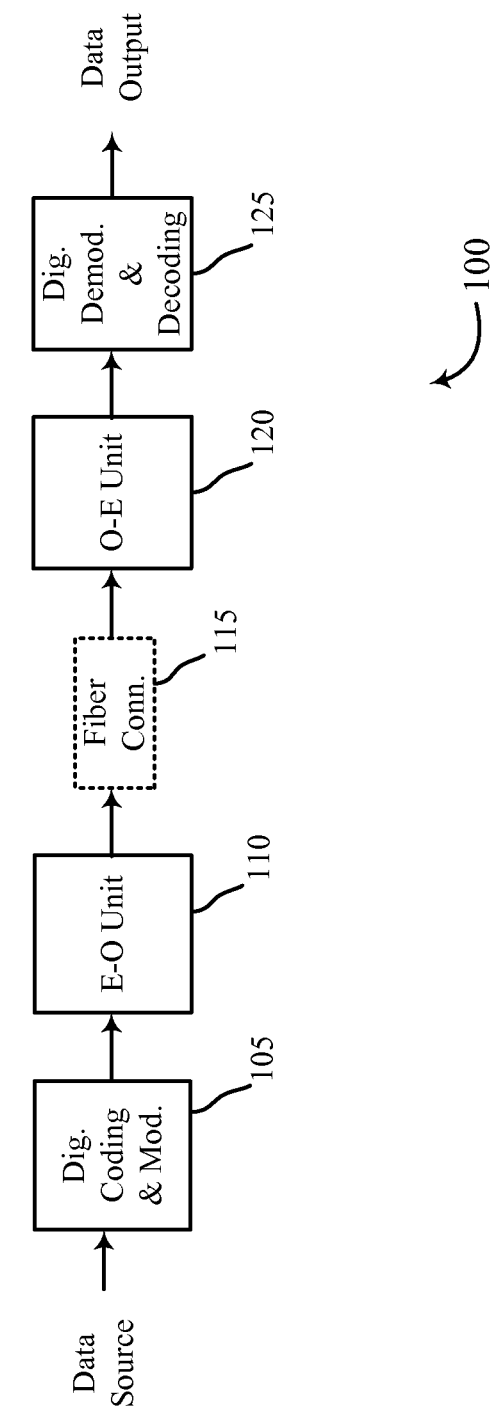
FIG. 1 is a block diagram of an example optical communication system including components configured according to various embodiments of the principles described herein.

Systems, devices, methods, and software are described for an optical communication system that utilizes fiber optic optical cables as a data transmission medium. An example of an optical data transport system 100 is illustrated in FIG. 1. In the present example, the optical data transport system 100 includes a digital coding and modulation unit 105, an electrical-to-optical (E-O) unit 110, a fiber connection 115, an optical-to-electrical (O-E) unit 120, and a digital demodulation and decoding unit 125. Each of these components may be in communication, directly or indirectly.

In the present embodiment, the optical data transport system 100 includes a data source that provides data to a digital coding and modulation unit 105. The data source may include any of a number of common data sources, such as a user telecommunications device, a cable operator head-end unit, a telecommunications provider central office, a computer server, or a network attached storage system, to name but a few examples. In many embodiments, the data source generates significant quantities of data to be transported across the optical data transport system 100.

The digital coding and modulation unit 105 receives this data, and performs framing, forward error correction coding, and modulation functions on the data. The electrical-to-optical (E-O) unit 110 transforms the data into optical signals, and transmits optical signals containing the data via a fiber connection 115. The fiber connection 115 may include well known components of such connections, including a fiber optic cable. An optical-to-electrical (O-E) unit 120 receives the optical signal from the fiber connection 115, and transforms the data into the electrical domain.

The digital demodulation and decoding unit 125 receives the digitized version of the optical signal and performs demodulation, forward error correction decoding, and de-framing functions on the data from the optical signal. The digital demodulation and decoding unit 125 may then output the data (e.g., to a user telecommunications device, a cable operator head-end unit, a telecommunications provider central office, a computer server, or a network attached storage system).

Conventional high-speed digital demodulation and decoding units 125 typically operate at an ADC sample rate of at least twice the symbol rate of the optical signal to achieve acceptable performance levels. However, by including pulse-shaping filters in the digital coding and modulation unit 105 and the digital demodulation and decoding unit 125, at least a portion of the functionality of the digital demodulation and decoding unit 125 may be performed using a sampling rate that is closer to one the symbol rate of the optical signal, thereby reducing the complexity and power consumption of the digital demodulation and decoding unit 125. Additionally, the use of pulse-shaping filters during modulation and demodulation, digital-to-analog converters (DACs) during modulation, and analog-to-digital converters (ADCs) during demodulation may allow for the pre- and post-compensation of non-ideal transmission conditions in the fiber connection 115, in the circuitry of the digital coding and modulation unit 105, and in the digital demodulation and decoding unit 125.

Figure 2:
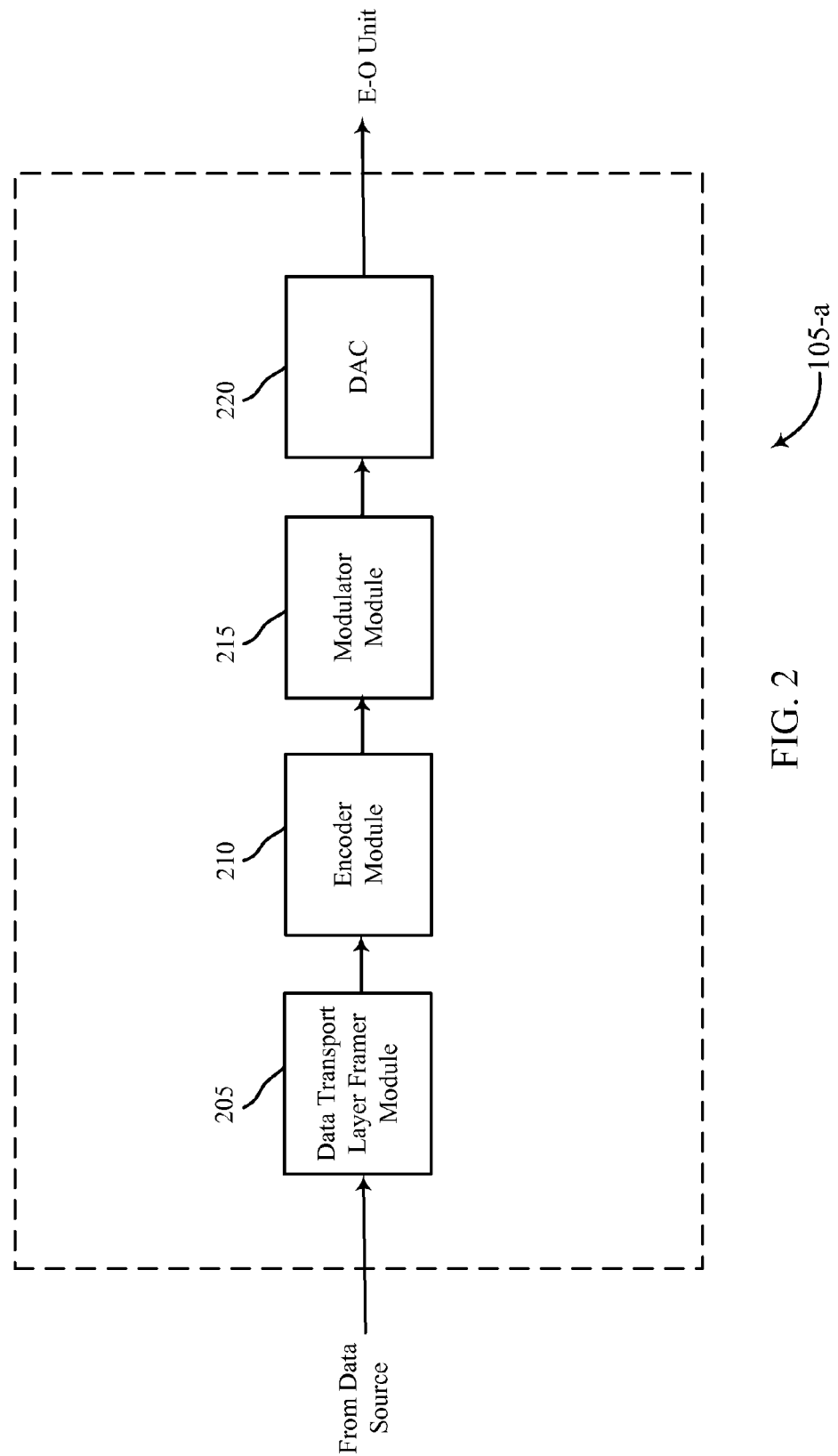
FIG. 2 is a block diagram of an example digital coding and modulation module according to various embodiments of the principles described herein.

FIG. 2 illustrates a digital coding and modulation unit 105-*a*. The digital coding and modulation unit 105-*a* may be an example of the digital coding and modulation unit 105 described above with reference to FIG. 1. In the illustrated embodiment, the digital coding and modulation unit 105-*a* includes a data transport layer framer module 205, an encoder module 210, a modulator module 215, and a digital-to-analog converter (DAC) 220. Each of these components may be in communication, directly or indirectly.

The data transport layer framer module 205 may place the data received from the data source into packet frames for transmission. The packet frames may conform to one of many common protocols for packet frames used in optical communications systems which commonly include a header and a payload, and possibly a trailer, such as a CRC. As is well understood, the header may be interleaved with the payload during transmission, depending upon the particular protocol being used for optical transmission.

The encoder module 210 may calculate and add forward error correction (FEC) information to the frames of data received from the data transport layer framer module 205. The particular type of FEC information of various embodiments may generally include systematically generated redundant error-correcting code (ECC) data that is transmitted along with the frames. There may be differential encoding used in some embodiments.

The modulator module 215 may perform pulse shaping and precompensation filtering on the frames and FEC information, and modulate the frames and FEC information onto one or more sinusoidal waves generated in the digital domain, and forward the data to the digital-to-analog converter 220. The digital-to-analog converter 220 may convert the digital signal of the modulated data into an analog signal, which may be forwarded to the E-O unit for conversion from electrical space to optical space. The optical signal from the E-O unit may be transmitted in the optical domain via a dual-polarity (dual-pole) quadrature phase-shift-keying (QPSK) modulation, resulting in four parallel optical streams (e.g., a horizontal in-phase (HI) stream, a horizontal quadrature (HQ) stream, a vertical in-phase (VI) stream, and a vertical quadrature (VQ) stream). Other modulation schemes may be used in other examples, as well.

Figure 3:
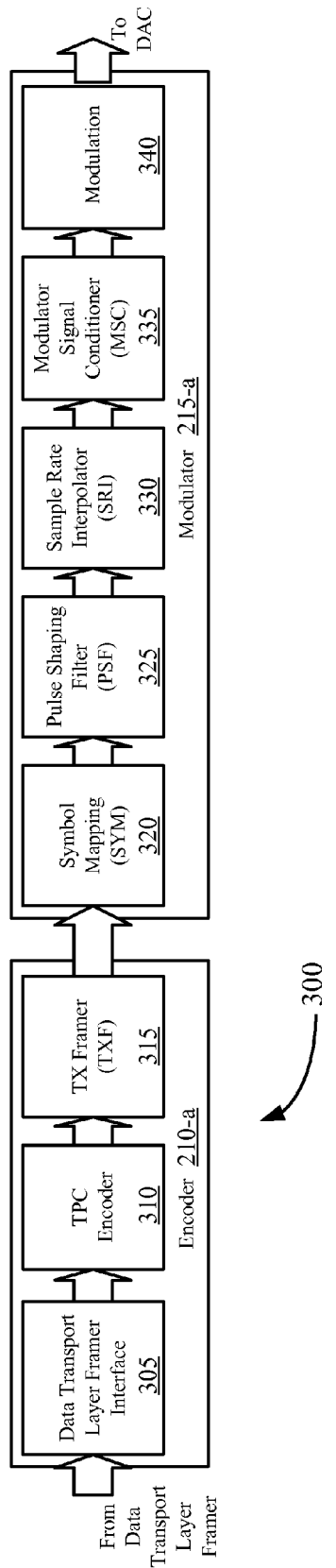
FIG. 3 is a block diagram of an example encoder and modulator in a digital coding and modulation module according to various embodiments of the principles described herein.

FIG. 3 illustrates a system 300 of an encoder module 210-a and a modulator module 215-a. Each of these components may be in communication, directly or indirectly. The encoder module 210-a and the modulator module 215-a may be examples, respectively, of the encoder module 210 and the modulator module 215 described above with reference to FIG. 2.

As shown in FIG. 3, the encoder module 210-a includes a data transport layer framer interface module 305, a turbo product code (TPC) encoder module 310, and a transmission framer module 315. The data transport layer framer interface module 305 may receive data to be transmitted from an application or other process external to the encoder 210-a. The data received from the data transport layer may be framed as one or more streams of serial bits for transmission.

The data transport layer framer interface module 305 may forward the data for transmission to the TPC encoder module 310. The TPC encoder module 310 may perform Turbo Product Code forward error correction on the data to be transmitted. Turbo Product Code encoding is a form of forward error correction (FEC) performed to increase data reliability and reduce the overall bandwidth used to transmit the data. In additional or alternative examples, other types of forward error correction encoding may be performed. The transmission framer module 315 may receive the TPC encoded bits and frame the bits for symbol mapping at the modulator 215-a.

The modulator may include a symbol mapping module 320, a pulse-shaping filter module 325, a sample rate interpolator module 330, a modulator signal conditioner module 335, and a modulation module 340. Each of these components may be in communication, directly or indirectly.

The symbol mapping module 320 may receive the framed, encoded bits from the transmission framer 315 of the encoder and map the bits to modulation symbols according to a particular modulation scheme. For example, where Dual-Polarization Quadrature Phase Shift Keying (DP-QPSK) is used, the symbol mapping module 320 may map the bits to quadrature and in-phase streams of a horizontal polarity and a vertical polarity.

Each of the symbol mapped bits may then be received at the pulse shaping filter module 325. At the pulse shaping module 325, each of the four streams may be filtered in the digital domain with at least one pulse shaping filter module 325. The at least one pulse shaping filter module 325 may include a finite impulse response (FIR) or infinite impulse response (IIR) filter with adjustable tap coefficients. The at least one pulse shaping filter may be, for example, a root-raised cosine filter or other known pulse shaping filter for reducing the bandwidth of each stream. Additionally or alternatively, each of the four streams may be filtered using an adjustable time and/or frequency domain filter.

Additionally, the pulse shaping filter module 325 may filter each stream of symbol mapped bits to pre-compensate for at least one known or predicted non-ideal transmission condition. The non-ideal transmission condition may occur in the optical space, such as a chromatic dispersion and/or timing skew that occurs when an optical signal is transmitted through an optical fiber or other optical medium. Additionally or alternatively, the non-ideal transmission condition may occur in the electrical space. For example, the non-ideal transmission condition may include a non-linear amplifier response at the transmission or receiving end, or component or channel roll-off that occurs in a DAC, an ADC, or another electrical component.

In certain examples, the non-ideal transmission condition may be predicted based on measurements taken at one or more points in the transmitter, the signal path, or the receiver. For example, an optical receiver may measure a certain degree of chromatic dispersion in a received optical signal and communicate with the transmitter to provide data about the measured chromatic dispersion. Additionally or alternatively, the non-ideal transmission condition may be modeled or estimated based on known properties of electrical and/or optical components in the signal path between the transmitter and the receiver.

The pulse shaping filter module 325 may pre-compensate for the at least one identified non-ideal transmission condition by calculating or estimating an effect of the non-ideal transmission condition on the transmitted optical signal and filtering the streams of symbol-mapped bits to at least partially reverse or lessen the effect of the non-ideal transmission condition(s). In certain examples, separate filters may be used to create the root-raised cosine pulse shape and to pre-compensate for non-ideal transmission conditions. Alternatively, a single digital filter may be used for each stream to both shape the pulses into the desired root-raised cosine shape and to make further adjustments to the shape of the pulses to pre-compensate for the non-ideal transmission conditions.

The pulse shaping filter(s) of the pulse shaping filter module 325 may be dynamically tunable through the use of changeable filter tap coefficients. In certain examples, the type of filter itself may be dynamically changed to pre-compensate for a non-ideal transmission condition. For example, one or more filters in the pulse shaping filter module 325 may be dynamically changed from a root-raised cosine filter to a simple raised-cosine filter, a Gaussian filter, or a sinc shaped filter if such a change would more effectively pre-compensate for a known or predicted non-ideal transmission condition.

Additionally, in certain examples it may be possible to dynamically customize the filtering performed at each stream of symbol mapped bits. Returning to the example of a DP-QPSK system, the symbol mapping module 320 may output HI, HQ, VI, and VQ streams. In such a system, it may be determined that an optical transmission path introduces a timing skew between the HI and HQ streams, but not the VI and VQ streams. In this example, the properties of a pulse shaping filter associated with the HI and/or HQ streams may be adjusted to pre-compensate for the timing skew without making adjustments to the VI and VQ streams.

The output of the pulse shaping filter module 325 may be received at the sample rate interpolator module 330. The sample rate interpolator module 330 may add bits to each of the streams of symbol mapped bits to increase the sample rate of each stream, for example, to twice the symbol rate. The modulator signal conditioner module 335 may receive the output of the sample rate interpolator module 330 and perform additional filtering on each of the streams in the digital domain. For example, the signal conditioner module 335 may perform direct current (DC) bias compensation. Additionally or alternatively, the signal conditioner module 335 may filter the streams to compensate for amplitude/amplitude (AM/AM) non-linearity caused by driving amplifiers into saturation and/or amplitude/phase non-linearity. The modulator signal conditioner module 335 may include tunable digital domain filters which may be dynamically adjusted as changes in DC bias or amplifier non-linearity are detected or predicted. In certain examples, some or all of the functionality of the signal conditioner module 335 may be performed at the phase shaping filter module 325.

The output of the modulator signal conditioner module 335 may be received by the modulation module 340. The modulation module 340 may generate sinusoidal waves in the digital domain and modulate the filtered, upsampled, and conditioned symbol-mapped bits output by the modulator signal conditioner module 335 onto the sinusoidal waveforms. In certain examples, the sinusoidal waveforms may have a relatively low intermediate frequency.

The modulated H and V waves may be output by the modulation module 340 to one or more DACs, which may convert each modulated carrier wave from the digital domain to the analog domain. The analog H and V carrier waves output by the DAC(s) may undergo amplification and additional conditioning, and then converted into separate H and V optical signals at an E-O unit (not shown).

Figure 4A:
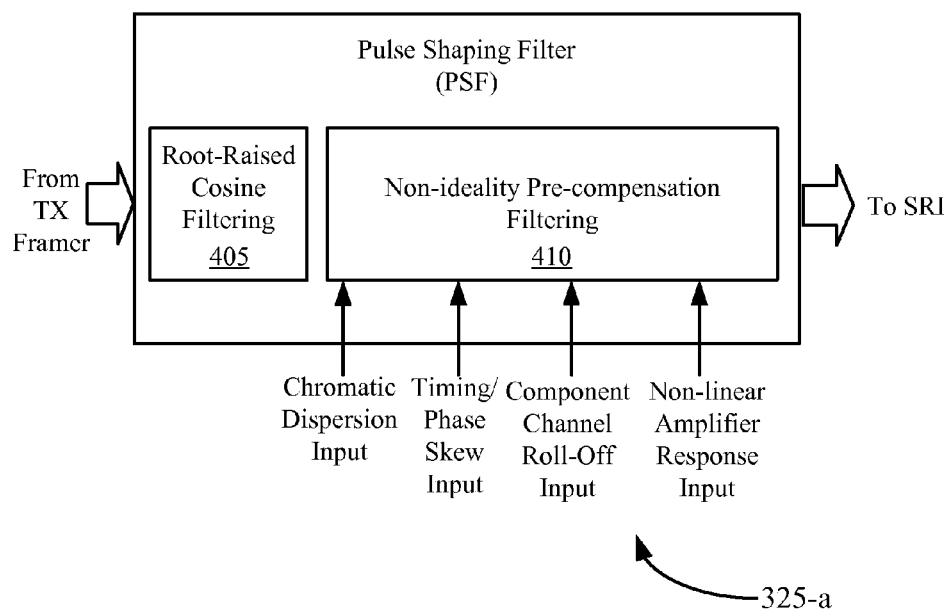
FIG. 4A and FIG. 4B are block diagrams of example pulse shaping filter modules, according to various embodiments of the principles described herein.
Figure 4B:
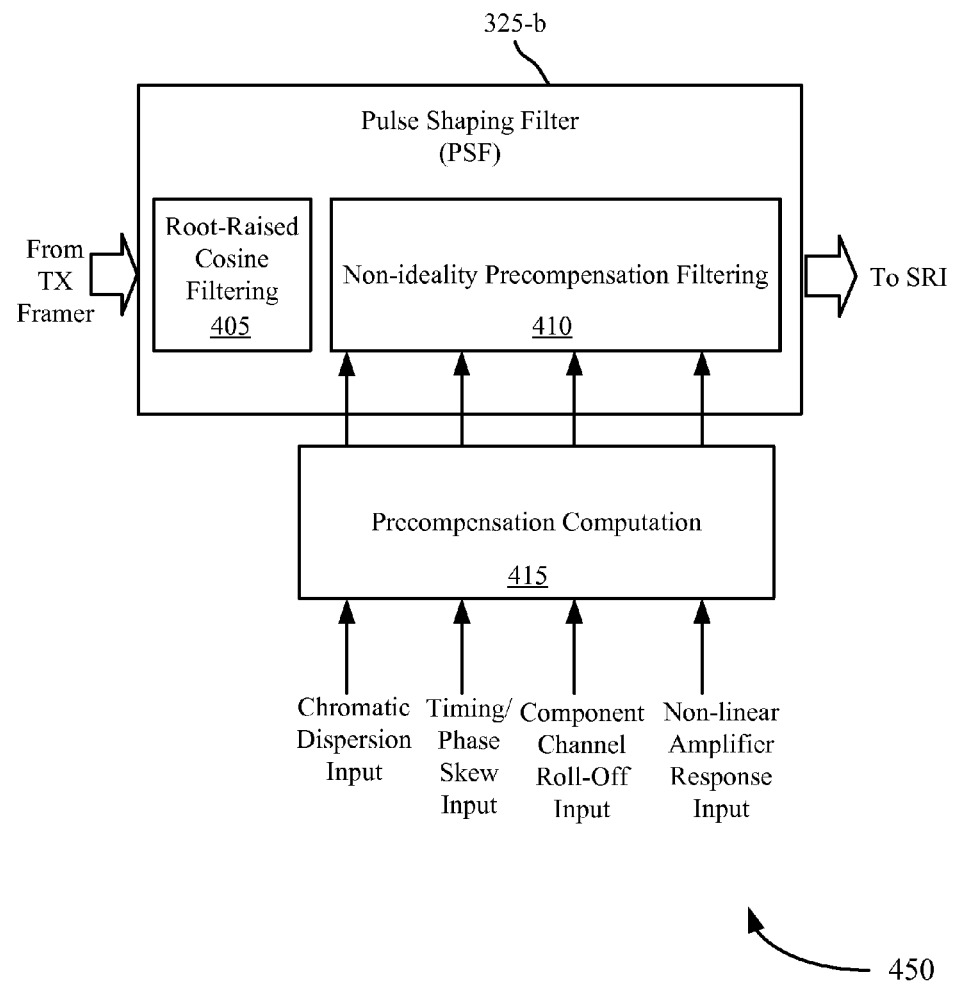

FIG. 4A and FIG. 4B are block diagrams of respective examples of pulse shaping filter modules 325. The pulse shaping filter modules 325 shown in FIGS. 4A and 4B may be examples of the pulse shaping filter module 325 described above with reference to FIG. 3.

Referring to FIG. 4A, the first example of the pulse shaping filter module 325-*a* may include a root-raised cosine filtering module 405 and a non-ideality pre-compensation filtering module 410. The root-raised cosine filtering module 405 may filter incoming streams of symbol-mapped bits (e.g., pulses of high and low voltages) to form the bits into a root-raised cosine shape. This root-raised cosine filtering may reduce the bandwidth of the streams, thereby reducing inter-symbol interference. Additionally or alternatively, other types of pulse shaping filters may be used, including, but not limited to, boxcar filters, sinc filters, raised-cosine filters, Gaussian filters, and the like.

The pulse shaping filter module 325-*a* additionally includes a non-ideality pre-compensation filtering module 410. The non-ideality pre-compensation filtering module 410 may filter the streams of symbol-mapped bits in the digital domain to compensate for one or more predicted or known non-ideal transmission conditions. As shown in FIG. 4A, the non-ideality pre-compensation filtering module 410 may receive input regarding chromatic dispersion in the signal path, input regarding timing phase or skew occurring in the signal path, input regarding component channel roll-off in the transmitter or receiver, and input regarding non-linear amplifier response in either the transmitter or the receiver. In alternate examples, input regarding more or fewer non-ideal transmission conditions may be received at the non-ideality pre-compensation filtering module 410.

The input may be used to generate a filtering function in the digital domain which is substantially inverse to a measured or predicted effect of the non-ideal transmission condition(s) to mitigate the detrimental effects of the identified non-ideal transmission conditions. In certain examples, the substantially inverse filtering functions may be pre-programmed or retrievable in memory. Additionally or alternatively, the input may include filter tap coefficients that weight certain aspects of one or more pulse shaping filters to pre-compensate for the identified non-ideal transmission condition(s). The input may be received directly from an external application or process or statically stored in a register. In certain examples, the input may include active feedback and/or measurements received by one or more components within the signal path of the optical signal. For example, a first device may transmit an optical signal to a second device, and the second device may measure one or more non-ideal transmission conditions based on the received optical signal and transmit the measurements or other feedback based on the measurements back to the first device.

In certain examples, the root-raised cosine filtering module 405 and the non-ideality pre-compensation filtering module 410 may be implemented by a single discrete filter for each stream of symbol mapped bits. Alternatively, the symbol mapped bits may be sequentially filtered by a root-raised cosine filtering filter and a non-ideality pre-compensation filter. In certain examples, the order in which each stream undergoes root-raised cosine filtering and non-ideality pre-compensation filter may vary. In certain examples, the order of filtering may be dynamically modified to achieve a most favorable result. Moreover, in certain examples, a first stream (e.g., the HI stream) of symbol mapped bits may be passed through root-raised cosine filtering and non-ideality pre-compensation filtering in a different order than a second stream (e.g., the VQ stream) of symbol mapped bits.

Referring now to FIG. 4B, a system 450 is shown in which a pulse shaping filter module 325-*b* similar to that shown in FIG. 4A is coupled to a precompensation computation module 415. The precompensation computation module 415 may receive input from an external application, process, or device and/or from one or more registers storing saved or default input regarding non-ideal transmission conditions. The input may be used by the precompensation computation module 415 to compute a set of filter tap coefficient values for a discrete pulse-shaping filter implementing at least the non-ideality precompensation filtering module 410. In certain examples, the precompensation computation module 415 may compute the filter tap coefficient values based on a weighted consideration of the totality of the received input. Additionally or alternatively, the precompensation computation module 415 may compute the filter tap coefficient values based on a one-to-one correlation between non-ideal transmission conditions and filter tap coefficient values.

Figure 5:
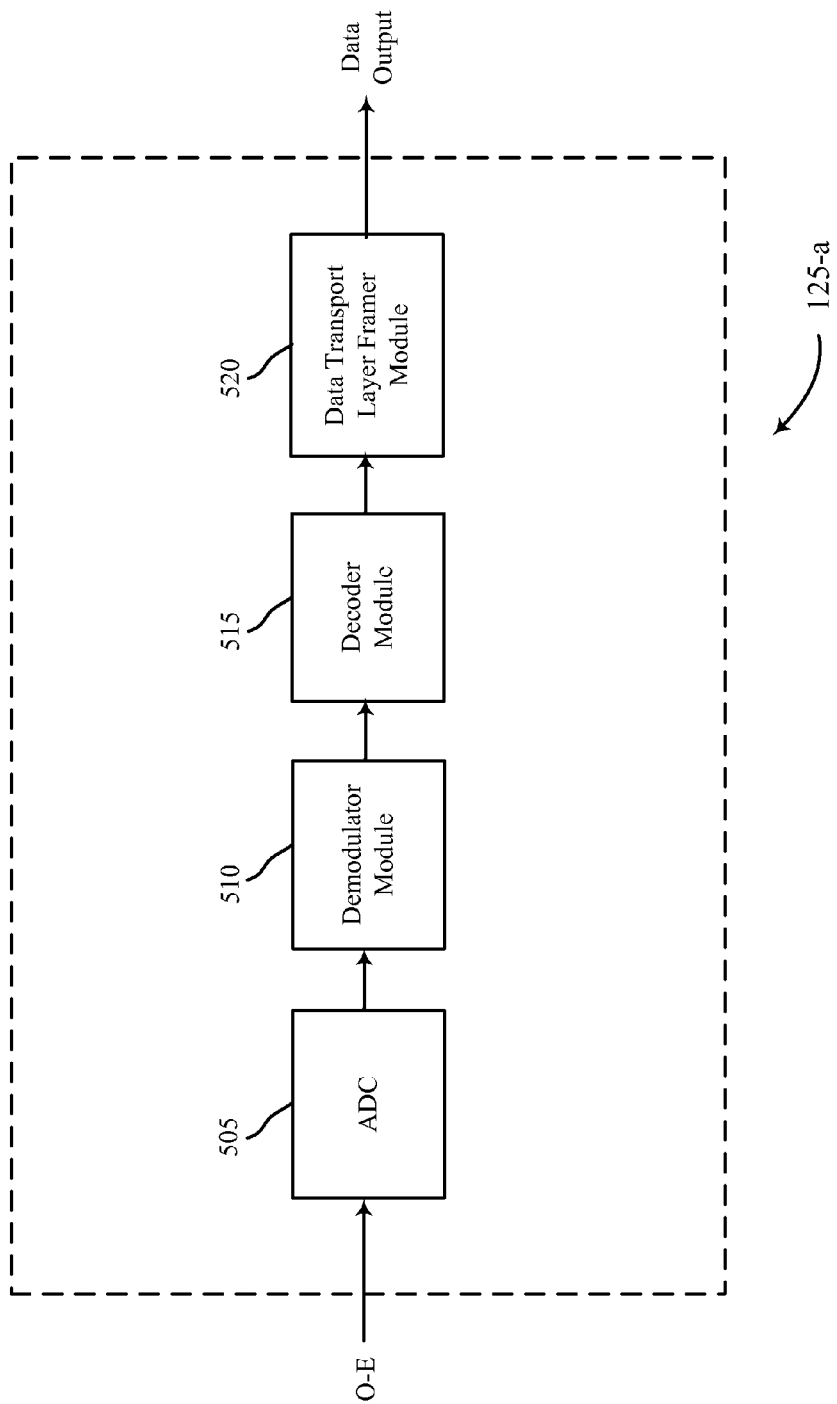
FIG. 5 is a block diagram of an example digital demodulation and decoding module according to various embodiments of the principles described herein.

As illustrated in FIG. 5, an example of a digital demodulation and decoding unit 125-*a* is shown. The digital demodulation and decoding unit 125-*a* may be an example of the digital demodulation and decoding unit 125 described above with reference to FIG. 1. In this embodiment, the digital demodulation and decoding unit 125-a includes an analog-to-digital converter 505, a demodulator module 510, a decoder module 515, and a data transport layer framer module 520. Each of these components may be in communication, directly or indirectly.

The analog-to-digital converter may sample an electrical analog version of an optical analog signal received by the optical-to-electrical unit. The analog-to-digital converter may provide a digitally sampled version of the optical analog signal to the demodulator module 510, which demodulates the data from the optical analog signal and provides the demodulated data to the decoder module 515. The decoder module 515 performs FEC decoding on the demodulated data, and may correct transmission errors identified from error-correcting code. The decoder module 515 provides the decoded and corrected data to the data transport layer framer module 520, which frames (or de-frames) the data from the signal according to the particular protocol used in the optical transmission, and provides output data. The data output may be, for example, a user or any receiving system.

Figure 6:
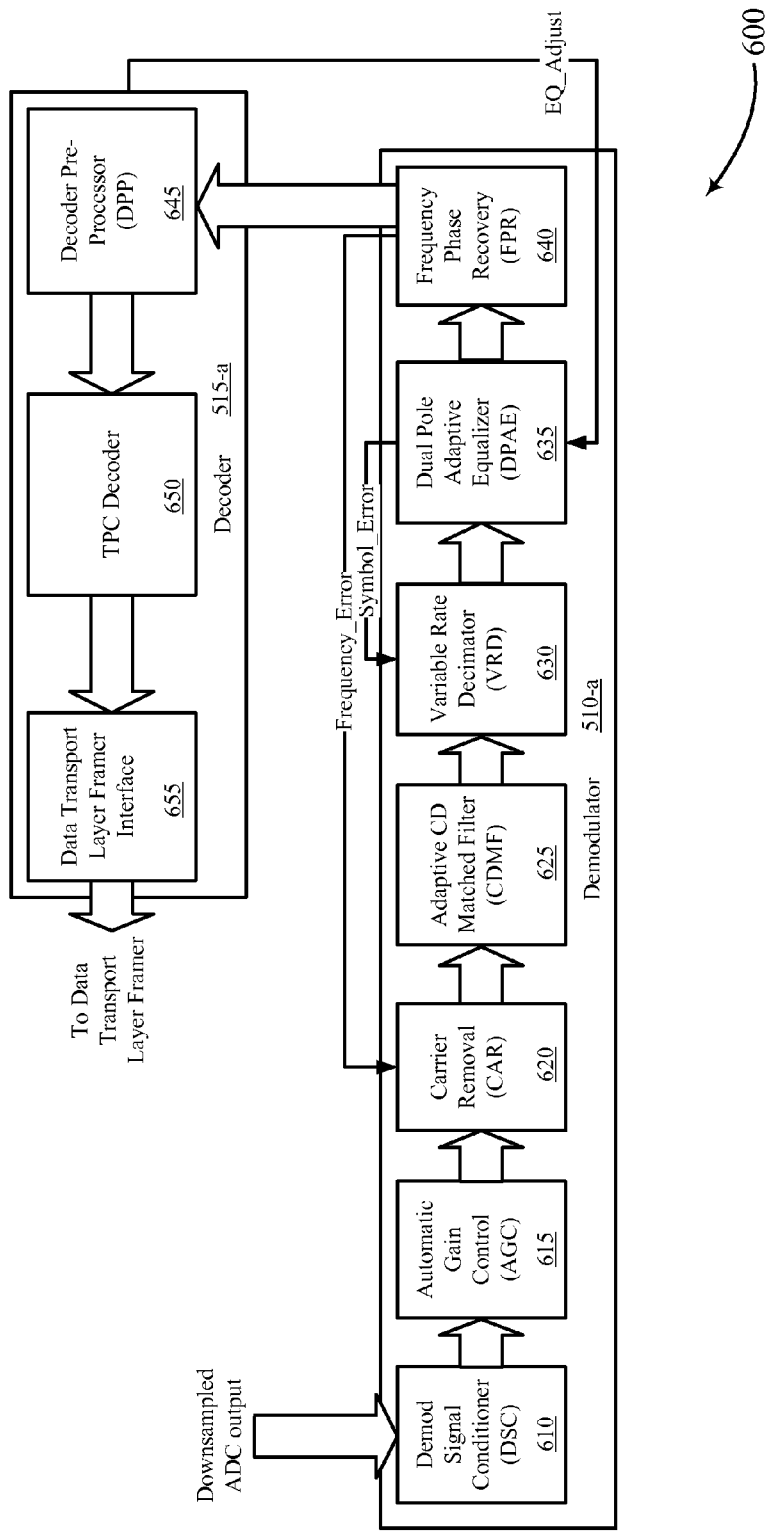
FIG. 6 is a block diagram of an example demodulator and decoder according to various embodiments of the principles described herein.

FIG. 6 is a block diagram of a system 600 including a demodulator module 510-a and a decoder module 515-a. Each of these components may be in communication, directly or indirectly. The demodulator module 510-a and the decoder module 515-a may be respective examples of the demodulator module 510 and the decoder module 515 described above with reference to FIG. 5.

In the example system 600 of FIG. 6, the demodulator 510-a includes a demodulator signal conditioner module 610, an automatic gain control module 615, a carrier removal module 620, an adaptive chromatic dispersion matched filter module 625, a variable rate decimator 630, a dual pole adaptive equalizer module 635, and a frequency phase recovery module 640.

Through the use of pulse shaping to reduce inter-symbol interference and the effects of non-ideal transmission conditions, it may be possible to perform some of the filtering and other preliminary demodulation steps on a version of the optical signal sampled at or near the baud rate (e.g., the symbol rate) of the optical signal. However, an ADC that samples the optical signal at a rate of twice the symbol rate may be more be more readily obtainable and less expensive than an ADC that samples at or near the baud rate of the optical signal. Consequently, an ADC that samples at twice the symbol rate may be used, and the output of the ADC may be immediately downsampled to just over the baud rate of the optical signal (e.g., between 1.0 and 1.3 times the baud rate).

The demodulator signal conditioner module 610 may receive the downsampled version of the ADC and perform preliminary filtering on the received sampled version of the optical signal. The automatic gain control module 615 may automatically adjust the gain of the downsampled version of the ADC to bring the amplitude of the modulated carrier wave into an acceptable range. The carrier removal module 620 may then extract the symbol-mapped bits from the carrier frequency according to the modulation scheme used in the optical signal. The adaptive chromatic dispersion matched filter 625 may filter the symbol-mapped bits to compensate for chromatic dispersion in the optical transmission path. In certain examples, the adaptive chromatic dispersion matched filter 625 may match one or more filters in the modulator of the device transmitting the optical signals.

The variable rate decimator module 630 may adjust the sampling rate of the symbol-mapped bits such that each stream of symbol-mapped bits is at a sampling rate that will allow for minimal inter-symbol interference during equalization. In certain cases, the variable rate decimator module 630 may upsample the extracted and filtered symbol mapped bits to the original sample rate of the analog-to-digital converter (e.g., twice the symbol rate). The dual pole adaptive equalizer module 635 performs additional filtering on the streams of symbol mapped bits in the digital domain to reduce inter-symbol interference and allow for the recovery of the modulated data. The dual pole adaptive equalizer module 635 may perform an inverse or matched filtering function of one or more pulse shaping filters in the transmitter. After equalization is performed, the frequency phase recovery module 640 may recover the encoded bits based on symbols representing changes in the phase of the modulated carrier frequency. For modulation schemes other than variations of phase-shift keying (PSK), additional or separate modules may be used as appropriate to demodulate the encoded data from the recovered symbols.

The decoder module 515-a of the present example includes a decoder pre-processor module 645, a Turbo Product Code decoder module 650, and a data transport layer framer interface module 655. Each of these components may be in communication, directly or indirectly.

The decoder pre-processor module 645 may enforce a set of rules to ensure the integrity and validity of the encoded data received from the demodulator module 510-a. The Turbo Product Code decoder module 650 may perform Turbo Product Code forward error correction on the encoded bits to identify and correct errors and reconstruct the originally transmitted stream of data. Additionally or alternatively, other methods of forward error correction may be used. The data transport layer framer interface 655 may forward the originally transmitted stream of data to a data transport layer framer for processing and delivery.

Figure 7:
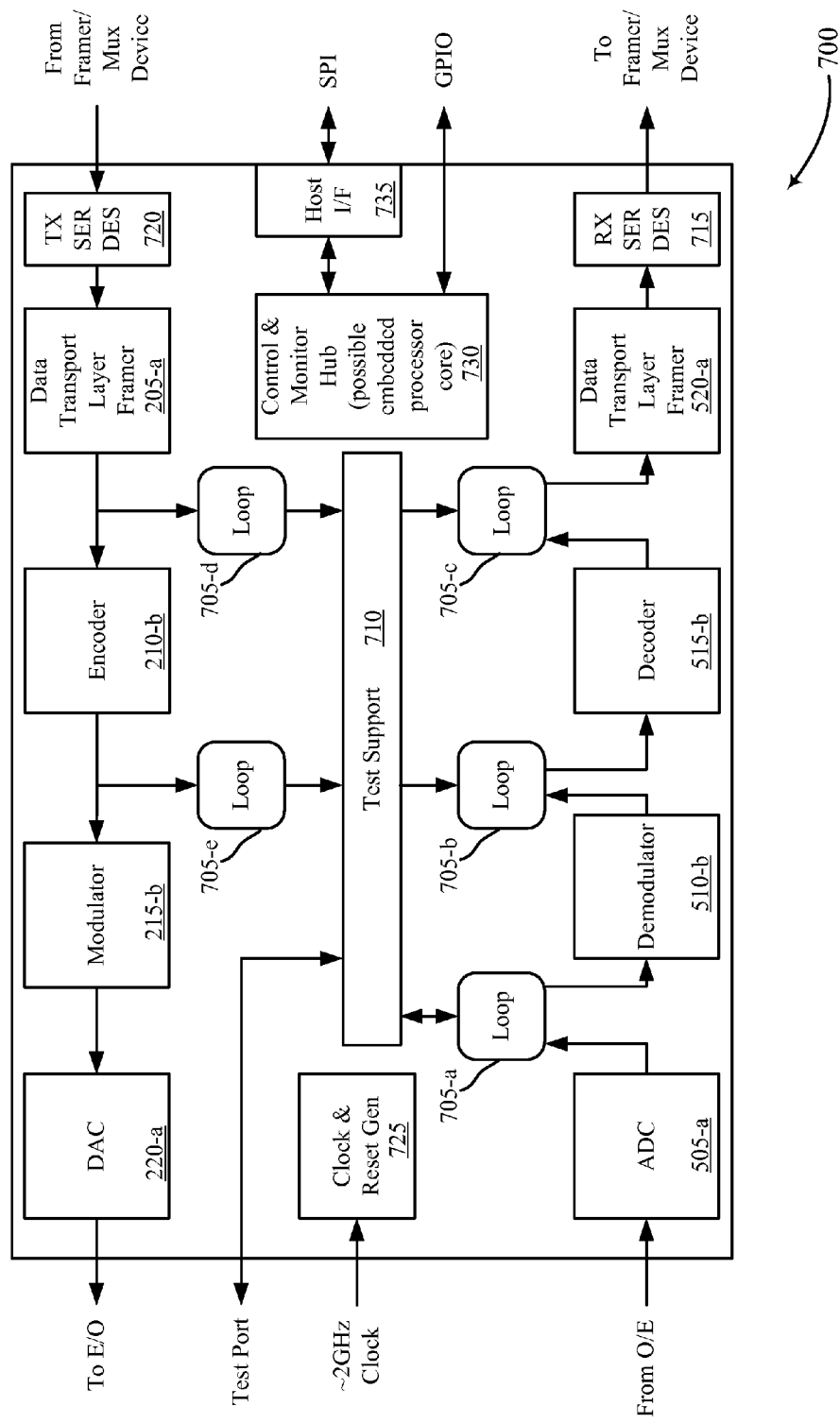
FIG. 7 is a block diagram of an example optical modem according to various embodiments of the principles described herein.

FIG. 7 illustrates a block diagram of an example modem 700 configured to modulate data for transmission as an optical signal and demodulate data received on a modulated optical signal. In certain examples, the modem 700 may be implemented on a single integrated circuit or chip. Alternatively, the modem 700 may be implemented as a number of discrete components in communication with each other.

On the outgoing data side, the modem 700 includes a data transport layer serial interface module 720, a data transport layer framer module 205, an encoder module 210-b, a modulator module 215-b, and a digital-to-analog converter 220-a. The data transport layer serial interface module 720 may receive one or more streams of serial data for transmission as an optical signal. The data transport layer framer module 205-a may be an example of the data transport layer framer module 205 described above with reference to FIG. 2. The encoder module 210-b may be an example of the encoder module 210 described above with reference to FIG. 2 or FIG. 3. The modulator module 215-b may be an example of the modulator module 215 described above with reference to FIG. 2 or FIG. 3. The digital-to-analog converter 220-a may be an example of the digital-to-analog converter 220 described above with reference to FIG. 2 or FIG. 3.

Thus, as data to be transmitted is received at the transport layer interface module 720, the data transport layer framer 205-a frames the data for encoding and modulation, the encoder module 210-b encodes the data with a forward error correction code. The modulator module 215-b maps the encoded data to modulation symbols, performs pulse shaping filtering on the encoded streams of symbol-mapped bits to reduce the bandwidth of the streams and pre-compensate for one or more non-ideal transmission conditions, and modulates the filtered encoded symbol-mapped bits onto one or more waveforms. The digital to analog converter 220-*a* generates an analog signal based on the digital version of the modulated signals, and outputs the analog electrical signal to an electrical-to-optical unit for conversion to an analog optical signal and transmission on an optical fiber.

On the incoming data side, the modem 700 includes an analog-to-digital converter 505-*a*, a demodulator module 510-*b*, a decoder module 515-*b*, a data transport layer framer module 520-*a*, and a receiving data layer interface 715. The analog-to-digital converter 505-*a* may be an example of the analog-to-digital converter 505 described above with reference to FIG. 5 or 6. The demodulator module 510-*b* may be an example of the demodulator module 510 described above with reference to FIG. 5 or FIG. 6. The decoder module 515-*b* may be an example of the decoder module 515 described above with reference to FIG. 5 or FIG. 6. The data transport layer framer 520-*a* may be an example of the data transport layer framer 520 described above with reference to FIG. 5 or FIG. 6.

Thus, as a modulated optical signal is received at the analog-to-digital converter, the analog-to-digital converter 505-*a* samples the optical signal and outputs a digital version of the optical signal to the demodulator module 510-*b*. The demodulator module 510-*b* removes the carrier signal, performs pulse-shaped filtering on the resulting stream of symbol mapped bits, and extracts a stream of encoded bits. The decoder module 515-*b* then performs error correction and decoding on the encoded bits to output the stream of transmitted data to the data transport layer framer 520-*a* and data transport layer interface 715 for additional processing and delivery to an intended destination.

The modem 700 shown in FIG. 7 may further include a number of loops 705 which allow a test support module 710 to provide a view of various stages of the encoding/modulation process and the decoding/demodulation process to an external process or user. The modem 700 further includes a clock and reset generator module 725 for providing local oscillator timing to the various components of the modem 700, and a control and monitor hub module 730 for managing the interaction between the components of the modem 700.

A host interface module 735 may allow an external process or user to access and interact with the control and monitor hub module 730 to view or control the operations of the modem 700 through a host interface 735 using a System Packet Interface (SPI) protocol. Alternatively, an external user or process may access the control and monitor hub module 730 through one or more General Purpose Input/Output (GPIO) pins. As indicated in FIG. 7, in certain embodiments the control and monitor hub 730 may include an embedded processor core.

Figure 8:
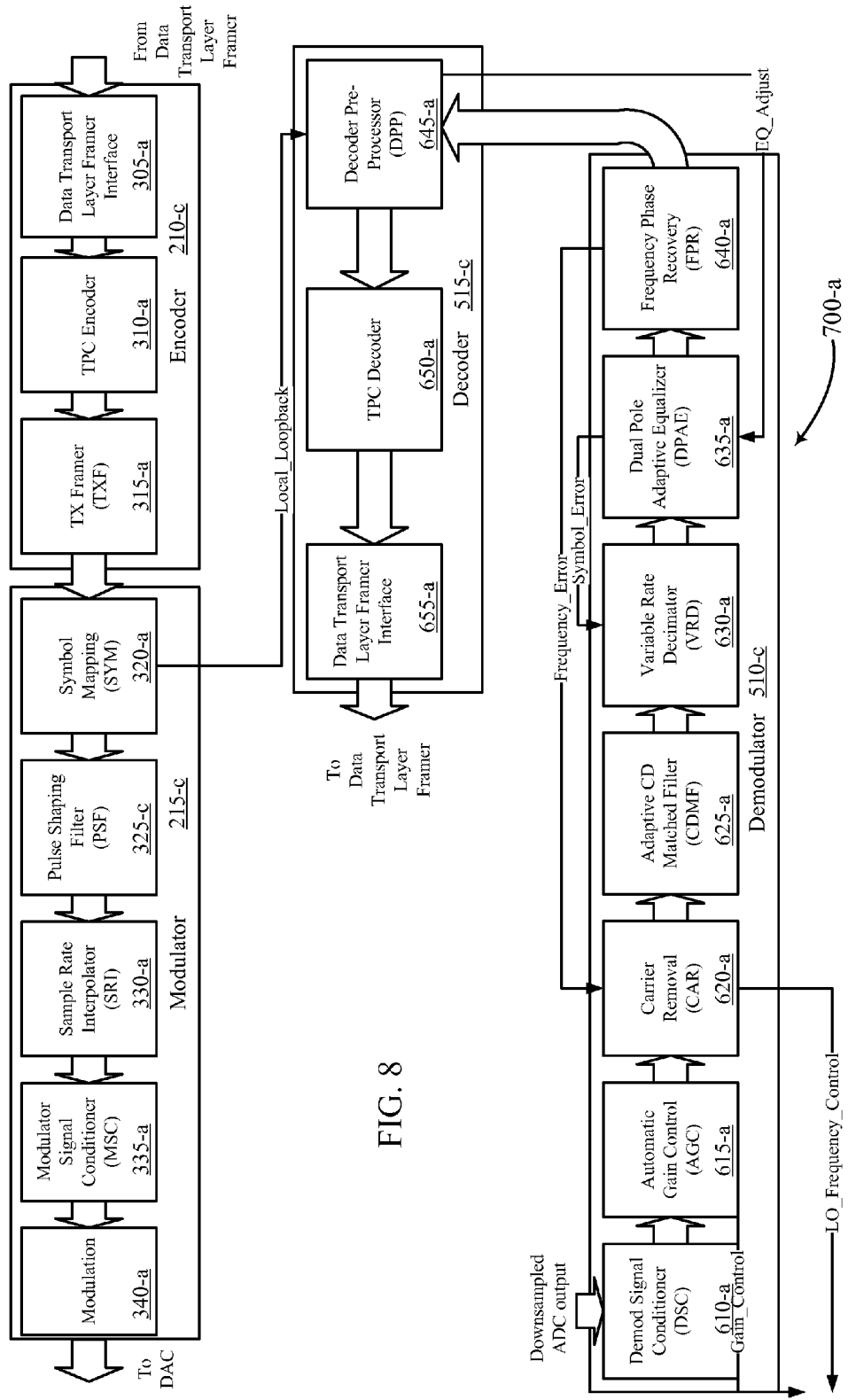
FIG. 8 is a block diagram of an example optical modem according to various embodiments of the principles described herein.

FIG. 8 illustrates a block diagram of another example modem device 700-*a*. The modem 700-*a* of FIG. 8 may be an example of the modem 700 described above with reference to FIG. 7. The example modem 700-*a* of FIG. 8 includes an encoder module 210-*c*, a modulator module 215-*c*, a demodulator module 510-*c* and a decoder module 515-*c*. The encoder module 210-*c* may be an example of the encoder module 210 described above with reference to FIG. 2, FIG. 3, or FIG. 7. The modulator module 215-*c* may be an example of the modulator module 215 described above with reference to FIG. 2, FIG. 3, or FIG. 7. The demodulator module 510-*c* may be an example of the demodulator module 510 described above with reference to FIG. 5, FIG. 6, or FIG. 7. The decoder module 515-*c* may be an example of the decoder module 515 described above with reference to FIG. 5, FIG. 6, or FIG. 7.

The encoder module 210-*c* may include a data transport layer framer interface module 305-*a*, a TPC encoder module 310-*a*, and a transmission framer module 315-*a*. These components may be examples of the data transport layer framer interface module 305, TPC encoder module 310, and transmission framer module 315 described above with reference to FIG. 3. The modulator module 215-*c* may include a symbol mapping module 320-*a*, a pulse shaping filter module 325-*c*, a sample rate interpolator module 330-*a*, a modulator signal conditioner module 335-*a*, and a modulation module 340-*a*. These components may be examples of the symbol mapping module 320, the pulse shaping filter 325 module, the sample rate interpolator module 330, the modulator signal conditioner 335, and the modulation module described above with reference to FIG. 3. Additionally, the pulse shaping filter 325-*c* may be an example of the pulse shaping filter 325-*a* or 325-*b* described above with reference to FIG. 4A or FIG. 4B.

The demodulator module 510-*c* of the present example may include a demodulator signal conditioner module 610-*a*, an automatic gain control module 615-*a*, a carrier removal module 620-*a*, an adaptive chromatic dispersion matched filter module 625-*a*, a variable rate decimator module 630-*a*, a dual pole adaptive equalizer module 635-*a*, and a frequency phase recovery module 640-*a*. These components may be examples of the demodulator signal conditioner module 610, the automatic gain control module 615, the carrier removal module 620, the adaptive chromatic dispersion matched filter module 625, the variable rate decimator module 630, the dual pole adaptive equalizer module 635, and the frequency phase recovery module 640 described above with reference to FIG. 6.

The decoder module 515-*c* may include a decoder pre-processor module 645-*a*, a TPC decoder module 650-*a*, and a data transport layer framer interface 655-*a*. These components may be examples of the decoder pre-processor module 645, the TPC decoder module 650, and the data transport layer framer interface module 655 described above with reference to FIG. 6.

As shown in FIG. 6, components of the modulator module 215-*c*, the decoder module 515-*c*, and the demodulator module 510-*c* may interact with each other. For example, the symbol mapping module 320-*a* of the modulator module 215-*c* may provide local loopback feedback to the decoder pre-processor module 645-*a* to increase the accuracy of the decoder pre-processor module 645-*a*. The decoder pre-processor module 645-*a* may provide an equalizer adjustment feedback signal to the dual pole adaptive equalizer 635-*a* of the demodulator 510-*c* to dynamically adjust the equalization filtering at the demodulator module 510-*c*.

The frequency phase recovery module 640-*a* of the demodulator module 510-*c* may provide a frequency error to the carrier removal module 620-*a* to allow the carrier removal module 620-*a* to achieve frequency lock with the carrier frequency. The dual pole adaptive equalizer module 635-*a* may provide a symbol error feedback to the variable rate decimator module 630-*a* to allow the variable rate decimator module 630-*a* to dynamically adjust the sampling rate and reduce inter-symbol interference. The carrier removal module 620-*a* may provide a local oscillator frequency control signal to correct the frequency of a local oscillator signal used to demodulate the received optical signal.

Figure 9:
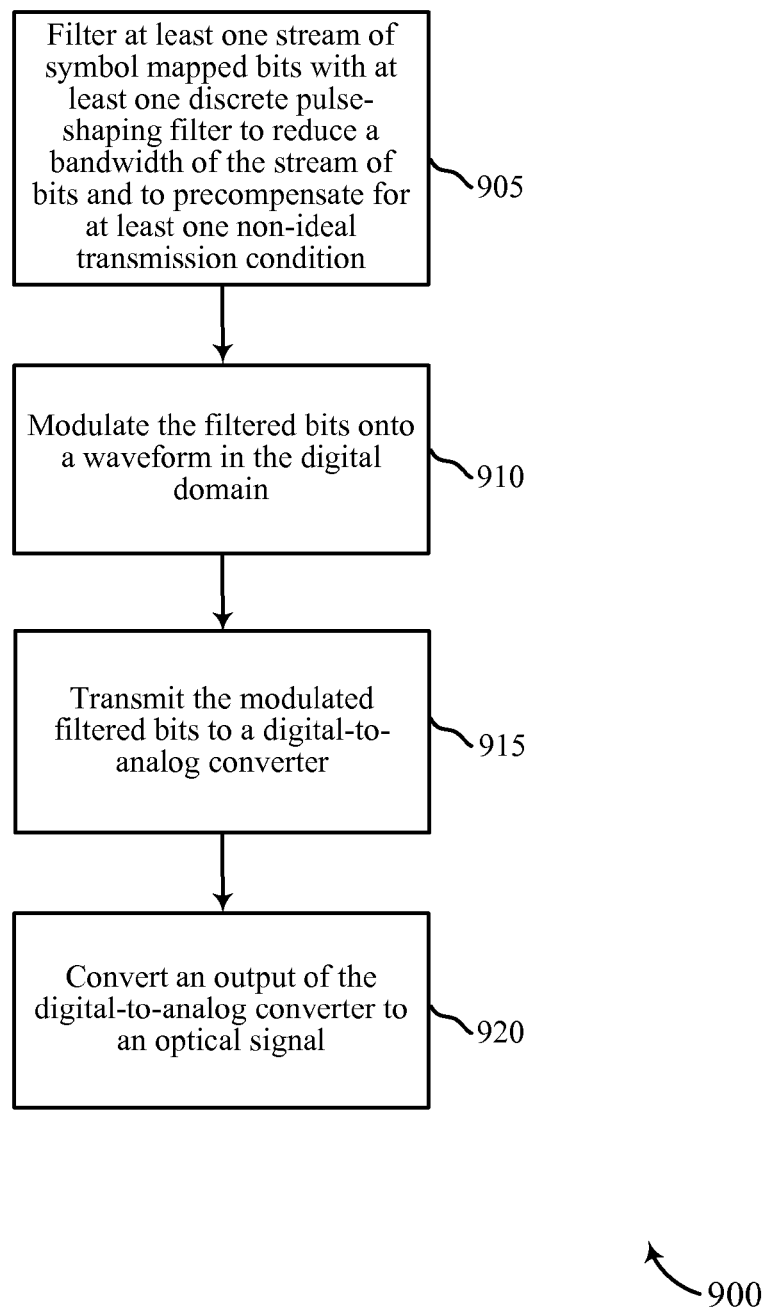
FIG. 9 is a flow chart of a method for modulating data onto an optical signal according to various embodiments of the principles described herein.

FIG. 9 illustrates a flowchart diagram of an example method 900 of modulating data onto an optical signal. The method 900 may be performed using, for example, the digital coding and modulation unit 105 of FIG. 1 or FIG. 2; the modulator module 215 of FIG. 2, FIG. 3, FIG. 7, or FIG. 8; the pulse shaping filter 325 of FIG. 3, FIG. 4A, FIG. 4B, or FIG. 5; and/or the modem of FIG. 7 or FIG. 8.

At block 905, at least one stream of symbol mapped bits is filtered with at least one discrete pulse-shaping filter to reduce a bandwidth of the stream of bits and to precompensate for at least one non-ideal transmission condition. In certain examples, the at least one discrete pulse-shaping filter may include a tunable root-raised cosine filter. The non-ideal transmission condition may occur in the optical space and/or in electronic space. For example, the non-ideal transmission may include one or more of: chromatic dispersion in an optical fiber, timing skew occurring in an optical fiber or elsewhere along a signal path, roll-off occurring in a DAC or other electronic component, a non-linear amplifier response, and/or any other applicable non-ideal transmission condition.

In certain examples, the non-ideal transmission condition may be predicted by calculating a set of likely transmission conditions based on known or estimated signal path and component characteristics, and/or by estimating a set of current transmission conditions from actual transmission conditions measured in the past at, for example, the receiver. An inverse filtering function to pre-compensate for the predicted non-ideal transmission condition may be determined, and input may be provided to the at least one discrete pulse shaping filter to cause the discrete pulse shaping filter to substantially implement at least a part of the inverse filtering function.

In certain examples, the at least one discrete pulse shaping filter may be a finite infinite response (FIR) or infinite impulse response (IIR) discrete filter with a number of adjustable tap coefficients. In these examples, the input provided to the filter to precompensate for the at least one non-ideal transmission condition may include a value for one or more of the tap coefficients.

At block 910, the filtered bits are modulated onto a waveform in the digital domain. For example, the waveform may be a sinusoidal waveform of an intermediate frequency that is generated electronically in the digital domain. In examples where modulation schemes such as Dual-Polarization QPSK (DP-QPSK) are used, this process may be performed in parallel for multiple optical signals at orthogonal polarizations.

At block 915, the modulated filtered bits are transmitted to a digital-to-analog converter (DAC), which converts the modulated filtered bits in the digital domain to an analog signal. At block 920, the analog signal output from the DAC is converted to an optical signal. In certain examples, the analog electronic signal output by the DAC and/or the optical signal may be conditioned and/or amplified.

Figure 10:
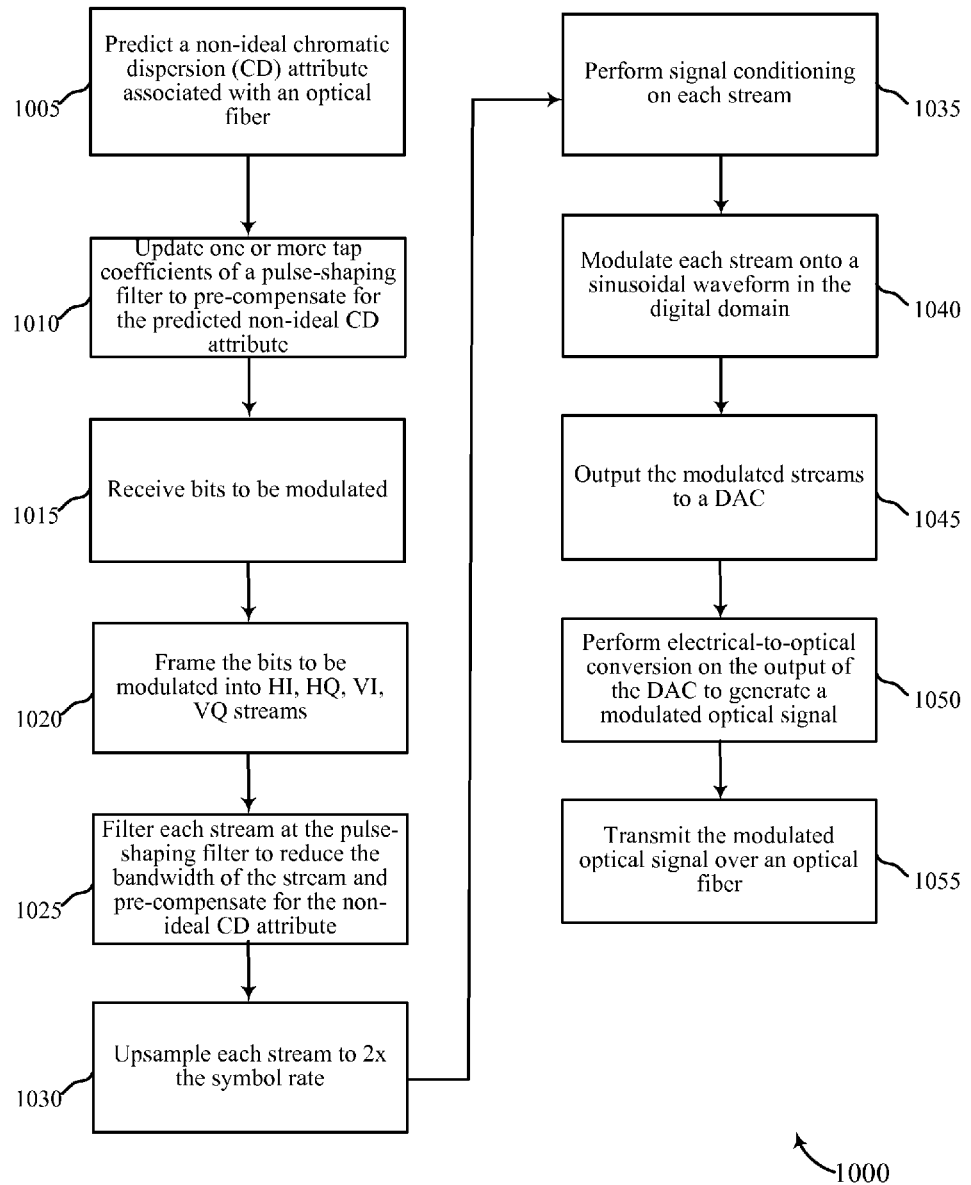
FIG. 10 is a flow chart of a method for modulating data onto an optical signal according to various embodiments of the principles described herein.

FIG. 10 illustrates a flowchart diagram of a more detailed example method 1000 of modulating data onto an optical signal. The method 1000 may be performed, using, for example, the digital coding and modulation unit 105 of FIG. 1 or FIG. 2; the modulator module 215 of FIG. 2, FIG. 3, FIG. 7, or FIG. 8; the pulse shaping filter 325 of FIG. 3, FIG. 4A, FIG. 4B, or FIG. 5; and/or the modem of FIG. 7 or FIG. 8. In certain examples, the method 1000 may be an example of the method 900 described above with reference to FIG. 9.

At block 1005, a non-ideal chromatic dispersion (CD) attribute associated with an optical fiber is predicted. The CD attribute may be predicted based on actual measurements, known CD associated with the type of the optical fiber, and/or any other method of predicting the CD attribute. At block 1010, one or more tap coefficients of a pulse-shaping filter are updated to pre-compensate for the predicted non-ideal CD attribute of the optical fiber. At block 1015, symbol-mapped bits to be modulated are received. At block 1020, the symbol-mapped bits are framed into horizontal in-phase (HI), horizontal quadrature (HQ), vertical in-phase (VI), and vertical quadrature (VQ) streams for DP-QPSK modulation.

At block 1025, each stream is filtered at the pulse-shaping filter or a duplicate of the pulse-shaping filter to reduce the bandwidth of the stream and pre-compensate for the non-ideal CD attribute. At block 1030, each stream is upsampled to twice the symbol rate. At block 1035, signal conditioning is performed on each stream, and at block 1040, each stream is modulated onto a waveform in the digital domain. At block 1045, the modulated streams are output to a DAC. At block 1050, electrical-to-optical conversion is performed on the output of the DAC to generate a modulated optical signal. At block 1055, the modulated optical signal is transmitted over an optical fiber. In certain examples, the output of the DAC is amplified prior to electrical-to-optical conversion and/or the optical signal is amplified prior to transmission over the optical fiber.

Figure 11:
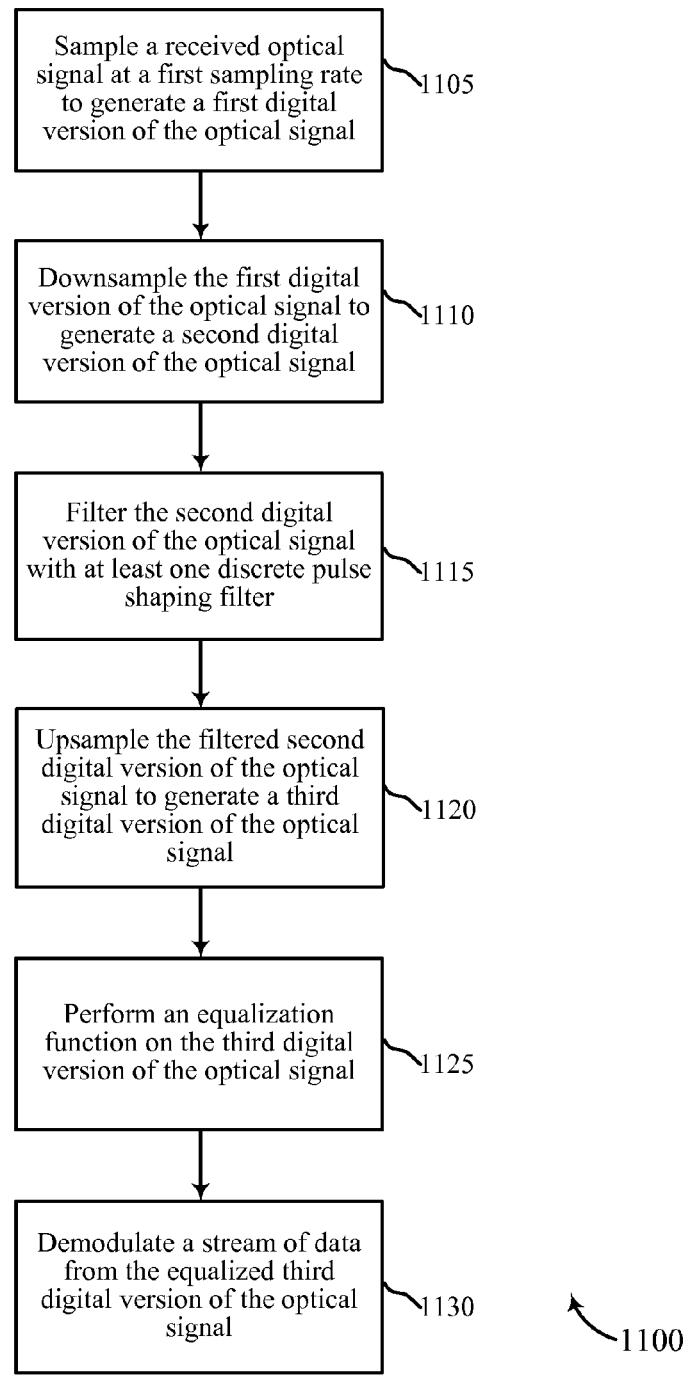
FIG. 11 is a flow chart of a method for demodulating data from an optical signal according to various embodiments of the principles described herein.

FIG. 11 illustrates a flowchart diagram of an example method 1100 of demodulating data from an optical signal. The method 1100 may be performed, using, for example, the digital demodulation and decoding unit 125 of FIG. 1 or FIG. 5; the demodulator module 510 of FIG. 5, FIG. 6, FIG. 7, or FIG. 8; the matched filter 625 of FIG. 6, FIG. 7, or FIG. 8; and/or the modem of FIG. 7 or FIG. 8.

At block 1105, a received optical signal is sampled at a first sampling rate to generate a first digital version of the optical signal. In certain examples, the first sampling rate may be twice the symbol rate of the optical signal. At block 1110, the first digital version of the optical signal is downsampled to generate a second digital version of the optical signal. In certain examples, the first digital version of the optical signal may be downsampled to a second sampling rate between 1.0 and 1.3 times the symbol rate of the optical signal. At block 1115, the second digital version of the optical signal is filtered with at least one discrete pulse shaping filter. The at least one discrete pulse shaping filter may be a matched filter to a discrete pulse shaping filter at a modulator of a transmitter from which the optical signal was received.

Through the use of the pulse-shaping filters, the first digital version of the optical signal may be downsampled to lower than its Nyquist sampling rate while preserving the integrity of the data. By filtering the downsampled version of the optical signal at the lower sampling rate, the complexity and gate count of the filtering circuitry may be reduced, thereby lowering the expense and power consumption of the demodulator circuitry.

At block 1120, the filtered second digital version of the optical signal is upsampled to generate a third digital version of the optical signal. In certain examples, the third digital version of the optical signal has the same sampling rate as the first digital version of the optical signal (e.g., twice the symbol rate of the optical signal). An equalization function is then performed on the third digital version of the optical signal at block 1125. In certain examples, the inter-symbol interference during the equalization function may be reduced if the third digital version of the optical signal has the same sampling rate as the first digital version of the optical signal. At block 1130, a stream of data is demodulated from the equalized third digital version of the optical signal.

Figure 12:
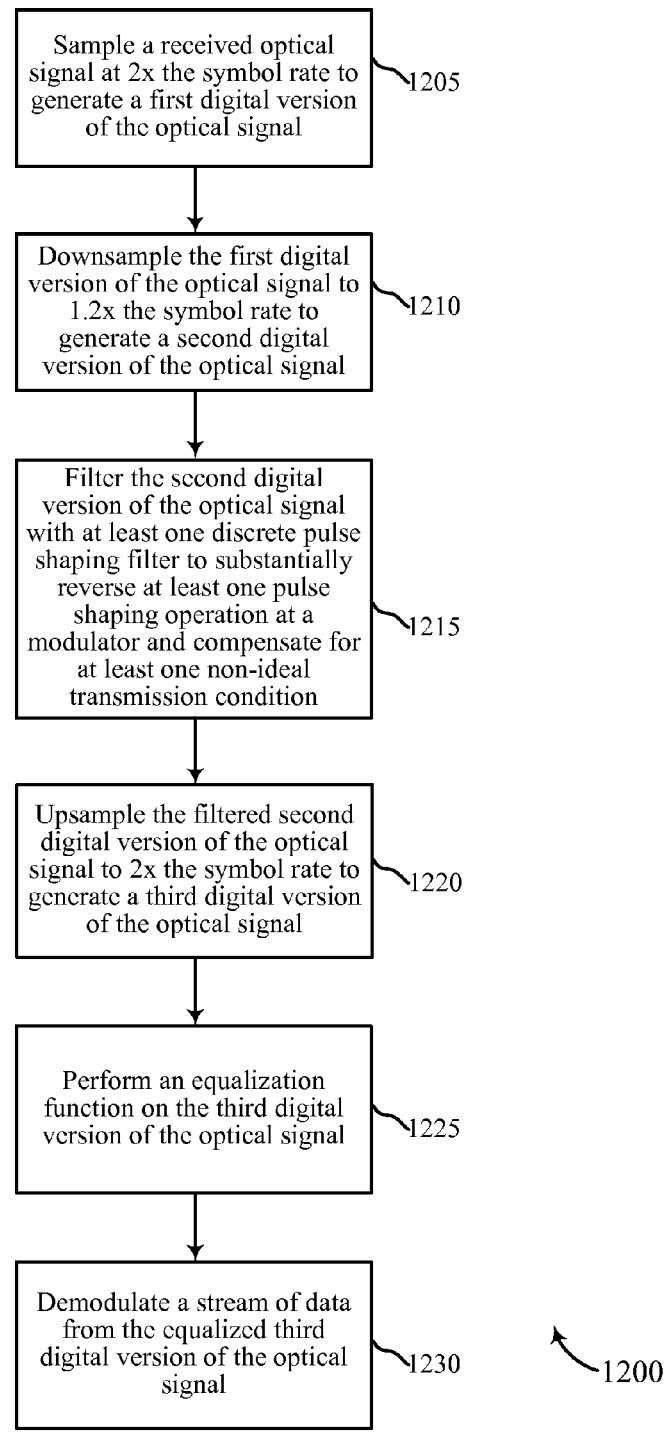
FIG. 12 is a flow chart of a method for demodulating data from an optical signal according to various embodiments of the principles described herein.

FIG. 12 illustrates a flowchart diagram of an example method 1200 of demodulating data from an optical signal. The method 1200 may be performed, using, for example, the digital demodulation and decoding unit 125 of FIG. 1 or FIG. 5; the demodulator module 510 of FIG. 5, FIG. 6, FIG. 7, or FIG. 8; the matched filter 625 of FIG. 6, FIG. 7, or FIG. 8; and/or the modem of FIG. 7 or FIG. 8. In certain examples, the method 1200 may be an example of the method 1100 described above with reference to FIG. 11.

At block 1205, a received optical signal is sampled at an analog-to-digital converter at twice the symbol rate of the optical signal to generate a first digital version of the optical signal. At block 1210, the first digital version of the optical signal is downsampled to 1.2 times the symbol rate to generate a second digital version of the optical signal. At block 1215, the second digital version of the optical signal is filtered with at least one discrete pulse shaping filter to substantially reverse at least one pulse shaping operation at a modulator and compensate for at least one non-ideal transmission condition (e.g., chromatic dispersion, timing skew, DAC or ADC roll-off, non-linear amplifier response, etc.).

At block 1220, the filtered second digital version of the optical signal is upsampled back to twice the symbol rate of the optical signal to generate a third version of the optical signal. At block 1225, an equalization function is performed on the third digital version of the optical signal. At block 1230, a stream of data is demodulated from the equalized third digital version of the optical signal.

As will be readily understood, the components and modules described with reference to various embodiments above may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of embodiments of the principles described herein.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the principles described herein. For example, the above elements may merely be a component of a larger system, wherein other rules may take precedence over or otherwise modify the application of the principles described herein. Also, a number of steps may be undertaken before, during, or after the above elements are considered. Accordingly, the above description should not be taken as limiting the scope of the invention.

What is claimed is:

1. An optical communication system, comprising:
   an optical transmitter comprising:
   a precompensation computation processor to:
   predict at least one non-ideal transmission condition;
   determine an inverse filtering function to precompensate for the at least one non-ideal transmission condition;
   a first discrete pulse-shaping filter to filter, based on input from the precompensation computation processor, at least one stream of symbol mapped bits to precompensate for the at least one non-ideal transmission condition, the input causing the first discrete pulse-shaping filter to substantially implement the inverse filtering function; and
   a modulator to modulate the filtered symbol mapped bits to a first optical signal; and
   an optical receiver configured to:
   sample a second optical signal at a first sampling rate at an analog-to-digital converter to generate a first digital version of the second optical signal, wherein the first sampling rate is at or near a symbol rate of the second optical signal;
   filter the first digital version of the second optical signal with at least a second discrete pulse-shaping filter;
   upsample the filtered first digital version of the second optical signal to generate a second digital version of the second optical signal;
   perform an equalization function on the second digital version of the second optical signal; and
   demodulate a stream of data from the equalized second digital version of the second optical signal.

2. The optical communication system of claim 1, wherein the at least one non-ideal transmission condition occurs in optical space.

3. The optical communication system of claim 1, wherein the optical receiver is configured to upsample the filtered first digital version to a second sampling rate, the second sampling rate being twice the symbol rate of the second optical signal.

4. The optical communication system of claim 1, wherein the input comprises a tap coefficient for the first discrete pulse-shaping filter.

5. The optical communication system of claim 1, wherein the precompensation computation processor is further configured to:
   receive a measurement of the at least one non-ideal transmission condition from a second optical receiver of the first optical signal,
   wherein the predicting the at least one non-ideal transmission condition is based at least partially on the received measurement.

6. An optical communication system, comprising:
   an optical transmitter comprising:
   a precompensation computation processor to:
   predict at least one non-ideal transmission condition;

determine an inverse filtering function to precompensate for the at least one non-ideal transmission condition;
a first discrete pulse-shaping filter to filter, based on input from the precompensation computation processor, at least one stream of symbol mapped bits to precompensate for the at least one non-ideal transmission condition, the input causing the first discrete pulse-shaping filter to substantially implement the inverse filtering function; and
a modulator to modulate the filtered symbol mapped bits to a first optical signal; and
an optical receiver configured to:
sample a second optical signal comprising pulse-shaped data modulated onto a carrier frequency at a first sampling rate to generate a first digital version of the second optical signal;
downsample the first digital version of the second optical signal to generate a second digital version of the second optical signal;
filter the second digital version of the second optical signal with at least one discrete pulse shaping filter;
upsample the filtered second digital version of the second optical signal to generate a third digital version of the second optical signal; and
demodulate a stream of data from the third digital version of the second optical signal.

7. The optical communication system of claim 6, wherein the input comprises a tap coefficient for the first discrete pulse-shaping filter.

8. The optical communication system of claim 6, wherein the precompensation computation processor is further configured to:
receive a measurement of the at least one non-ideal transmission condition from a second optical receiver of the first optical signal,
wherein the predicting the at least one non-ideal transmission condition is based at least partially on the received measurement.

9. The optical communication system of claim 6, wherein the first sampling rate is twice a symbol rate of the second optical signal.

10. The optical communication system of claim 6, wherein the optical receiver is configured to downsample the first digital version to a second sampling rate, the second sampling rate being between 1.0 and 1.3 times a symbol rate of the second optical signal.

11. The optical communication system of claim 6, wherein the optical receiver is configured to upsample the filtered second digital version to the first sampling rate.

12. The optical communication system of claim 6, wherein the at least one non-ideal transmission condition occurs in optical space or in electrical space.

13. The optical communication system of claim 6, wherein the at least one non-ideal transmission condition comprises a chromatic dispersion occurring in an optical fiber, a roll-off in a digital-to-analog converter, a non-linear amplifier response, a timing skew occurring along a signal path.

14. The optical communication system of claim 1, wherein the first sampling rate is between 1.0 and 1.3 times the symbol rate of the second optical signal.

15. The optical communication system of claim 1, wherein the optical receiver is configured to upsample the filtered first digital version to a second sampling rate, the second sampling rate being twice the symbol rate of the second optical signal.

16. The optical communication system of claim 1, wherein the at least one non-ideal transmission condition comprises a chromatic dispersion occurring in an optical fiber, a roll-off in a digital-to-analog converter, a non-linear amplifier response, a timing skew occurring along a signal path.

17. The optical communication system of claim 1, wherein the at least one non-ideal transmission condition occurs in electrical space.

18. A method for optical communications, comprising:
predicting, at a precompensation computation processor of an optical transmitter, at least one non-ideal transmission condition for a first optical signal;
determining, at the precompensation computation processor, an inverse filtering function to precompensate for the at least one non-ideal transmission condition;
filtering at least one stream of symbol mapped bits with a first discrete pulse-shaping filter to precompensate for the at least one non-ideal transmission condition by substantially implementing the inverse filtering function;
modulating the filtered symbol mapped bits to the first optical signal;
transmitting the first optical signal;
sampling, at an optical receiver, a second optical signal at a first sampling rate at an analog-to-digital converter to generate a first digital version of the second optical signal, wherein the first sampling rate is at or near a symbol rate of the second optical signal;
filtering the first digital version of the second optical signal with a second discrete pulse-shaping filter;
upsampling the filtered first digital version of the second optical signal to generate a second digital version of the second optical signal;
performing an equalization function on the second digital version of the second optical signal; and
demodulating a stream of data from the equalized second digital version of the second optical signal.

19. The method of claim 18, further comprising:
updating at least one tap coefficient for the first discrete pulse-shaping filter to implement the inverse filtering function.

20. The method of claim 18, further comprising:
receiving a measurement of the at least one non-ideal transmission condition from a second optical receiver of the first optical signal,
wherein the predicting the at least one non-ideal transmission condition is based at least partially on the received measurement.

21. The method of claim 18, wherein the first sampling rate is between 1.0 and 1.3 times the symbol rate of the second optical signal.

22. The method of claim 18, the upsampling the filtered first digital version of the second optical signal comprising:
upsampling the filtered first digital version to a second sampling rate, the second sampling rate being twice the symbol rate of the second optical signal.

23. The method of claim 18, wherein the at least one non-ideal transmission condition occurs in optical space or in electrical space.

24. The method of claim 18, wherein the at least one non-ideal transmission condition comprises a chromatic dispersion occurring in an optical fiber, a roll-off in a digital-to-analog converter, a non-linear amplifier response, a timing skew occurring along a signal path.

25. A method for optical communications, comprising:
predicting, at a precompensation computation processor of an optical transmitter, at least one non-ideal transmission condition for a first optical signal;
determining, at the precompensation computation processor, an inverse filtering function to precompensate for the at least one non-ideal transmission condition;
filtering at least one stream of symbol mapped bits with at least a first discrete pulse-shaping filter to precompensate for the at least one non-ideal transmission condition by substantially implementing the inverse filtering function;
modulating the filtered symbol mapped bits to the first optical signal;
transmitting the first optical signal;
sampling, at an optical receiver, a second optical signal comprising pulse-shaped data modulated onto a carrier frequency at a first sampling rate to generate a first digital version of the second optical signal;
downsampling the first digital version of the second optical signal to generate a second digital version of the second optical signal;
filtering the second digital version of the second optical signal with at least one discrete pulse shaping filter;
upsampling the filtered second digital version of the second optical signal to generate a third digital version of the second optical signal;
demodulating a stream of data from the third digital version of the second optical signal.

26. The method of claim 25, further comprising:
updating at least one tap coefficient for the first discrete pulse-shaping filter to implement the inverse filtering function.

27. The method of claim 25, further comprising:
receiving a measurement of the at least one non-ideal transmission condition from a second optical receiver of the first optical signal,
wherein the predicting the at least one non-ideal transmission condition is based at least partially on the received measurement.

28. The method of claim 25, wherein the first sampling rate is twice a symbol rate of the second optical signal.

29. The method of claim 25, wherein the downsampling comprises downsampling the first digital version to a second sampling rate, the second sampling rate being between 1.0 and 1.3 times a symbol rate of the second optical signal.

30. The method of claim 25, wherein the upsampling comprises upsampling the filtered second digital version to the first sampling rate.

31. The method of claim 25, wherein the at least one non-ideal transmission condition occurs in electrical space or in optical space.

32. The method of claim 25, wherein the at least one non-ideal transmission condition comprises a chromatic dispersion occurring in an optical fiber, a roll-off in a digital-to-analog converter, a non-linear amplifier response, a timing skew occurring along a signal path.

* * * * *